United States Patent
Baldwin et al.

(10) Patent No.: US 7,428,852 B2
(45) Date of Patent: Sep. 30, 2008

(54) ACTUATOR MECHANISM FOR SHIFT MOTORS OF A TRANSMISSION

(75) Inventors: Reid Baldwin, Howell, MI (US); David Janson, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 317 days.

(21) Appl. No.: 11/374,354

(22) Filed: Mar. 13, 2006

(65) Prior Publication Data

US 2007/0209460 A1  Sep. 13, 2007

(51) Int. Cl.
 *F16H 59/00* (2006.01)
 *F16H 61/00* (2006.01)
 *F16H 63/00* (2006.01)

(52) U.S. Cl. .......... 74/337.5; 74/329; 74/330; 74/331; 74/335; 74/340; 74/358; 74/360; 192/48.4; 192/48.9; 192/93 B

(58) Field of Classification Search ............ None
See application file for complete search history.

(56) References Cited

U.S. PATENT DOCUMENTS

| | | | | |
|---|---|---|---|---|
| 4,656,882 A | * | 4/1987 | Kerr | 74/337.5 |
| 6,044,719 A | * | 4/2000 | Reed et al. | 74/330 |
| 6,851,326 B2 | * | 2/2005 | Wild et al. | 74/335 |
| 7,073,407 B2 | * | 7/2006 | Stefina | 74/331 |
| 7,197,954 B2 | * | 4/2007 | Baldascini et al. | 74/331 |
| 7,305,900 B2 | * | 12/2007 | Suzuki et al. | 74/340 |
| 2003/0019312 A1 | | 1/2003 | Gumpoltsberger et al. | |

FOREIGN PATENT DOCUMENTS

| | | |
|---|---|---|
| DE | 19920440 | 11/2000 |
| GB | 791662 | 3/1958 |

* cited by examiner

*Primary Examiner*—David D. Le
(74) *Attorney, Agent, or Firm*—David B. Kelley; MacMillan, Sobanski & Todd, LLC

(57) ABSTRACT

A system for actuating couplers to produce gear changes in a motor vehicle transmission includes first and second actuator drums supported for rotation, and first and second shift forks. Each first shift fork is driveably connected to a first actuator drum, secured to a first coupler, and displaced in response to rotation of a first actuator drum between a neutral state, wherein no gear is engaged, and at least one first drive state, wherein a gear of a first gear group is engaged. Each second shift fork is driveably connected to a second actuator drum, secured to a second coupler, and displaced in response to rotation of a second actuator drum between a neutral state, wherein no gear is engaged, and at least one second drive state, wherein a gear of the second gear group is engaged.

20 Claims, 4 Drawing Sheets

ACTUATOR MECHANISM FOR SHIFT MOTORS OF A TRANSMISSION

BACKGROUND OF THE INVENTION

The preferred embodiment relates generally to an apparatus for actuating couplers that engage gears in a transmission.

A twin clutch transmission must have some mechanism to move shift forks to engage gears. Shift drums convert rotary motion of a drum into appropriate linear motion of a set of shift forks. For optimal shift flexibility, it is best to have separate control of the engagement of the odd-numbered gears and the even-numbered gears. However, it is also advantageous to locate the shift drum physically close to the shift forks. Unfortunately, odd and even gears tend to be located at opposite ends of the gearbox, with both odd and even gears along each side. For example, the first, second and sixth gears may be located on one side of the gearbox, and the third, fourth, and fifth, and reverse gears are located on the opposite side.

It is feasible to use one electric motor to engage and disengage gears one, two and six and to use another electric motor to engage and disengage gears three, four, five and reverse. But complex mechanisms are required in order to enable three gear step shifts, i.e., six-three, five-two downshifts, with that arrangement. These complex mechanisms introduce potential failure modes. Also, these arrangements require an additional interlock mechanism to preclude simultaneous engagement of multiple odd gears or multiple even gears.

SUMMARY OF THE INVENTION

An advantage resulting from a preferred embodiment relative to previous odd/even drum solutions is that the actuator drums can be located close to the shift forks, thereby minimizing the length of the fork mechanism.

One electric motor is used to control engagement of the second, fourth, and sixth and reverse gears; another electric motor controls engagement of the first, third and fifth gears. This arrangement provides optimal shift flexibility and allows separate control of the engagement and disengagement of odd and even gears.

One embodiment uses four actuator drums instead of two: One drum for odd gears on the first side of the gearbox, another drum for even gears on the first side, a third drum for odd gears on the second side, and a fourth drum for even gears on the second side. The actuator drums on each side can be co-axial and located close to the shift forks they control. One motor drives the actuator drums that control the odd gears, and another motor drives the drums that control the even gears. The motors are connected to the drums through gearing such that the odd drums rotate in unison and the even drums rotate in unison.

The gearing can be accomplished in multiple ways. In one embodiment, two shafts perpendicular to the drums drive the drums through worm gears. Each shaft is driven by one of the motors by spur gears or by bevel gears.

In one embodiment, a system for actuating couplers to produce gear changes in a motor vehicle transmission includes first and second actuator drums supported for rotation, and first and second shift forks. Each first shift fork is driveably connected to a first actuator drum, secured to a first coupler, and displaced in response to rotation of a first actuator drum between a neutral state, wherein no gear is engaged, and at least one first drive state, wherein a gear of a first gear group is engaged. Each second shift fork is driveably connected to a second actuator drum, secured to a second coupler, and displaced in response to rotation of a second actuator drum between a neutral state, wherein no gear is engaged, and at least one second drive state, wherein a gear of the second gear group is engaged.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of the embodiments when considered in the light of the accompanying drawings in which.

DESCRIPTION OF THE PREFERRED EMBODIMENT

Figure 1:
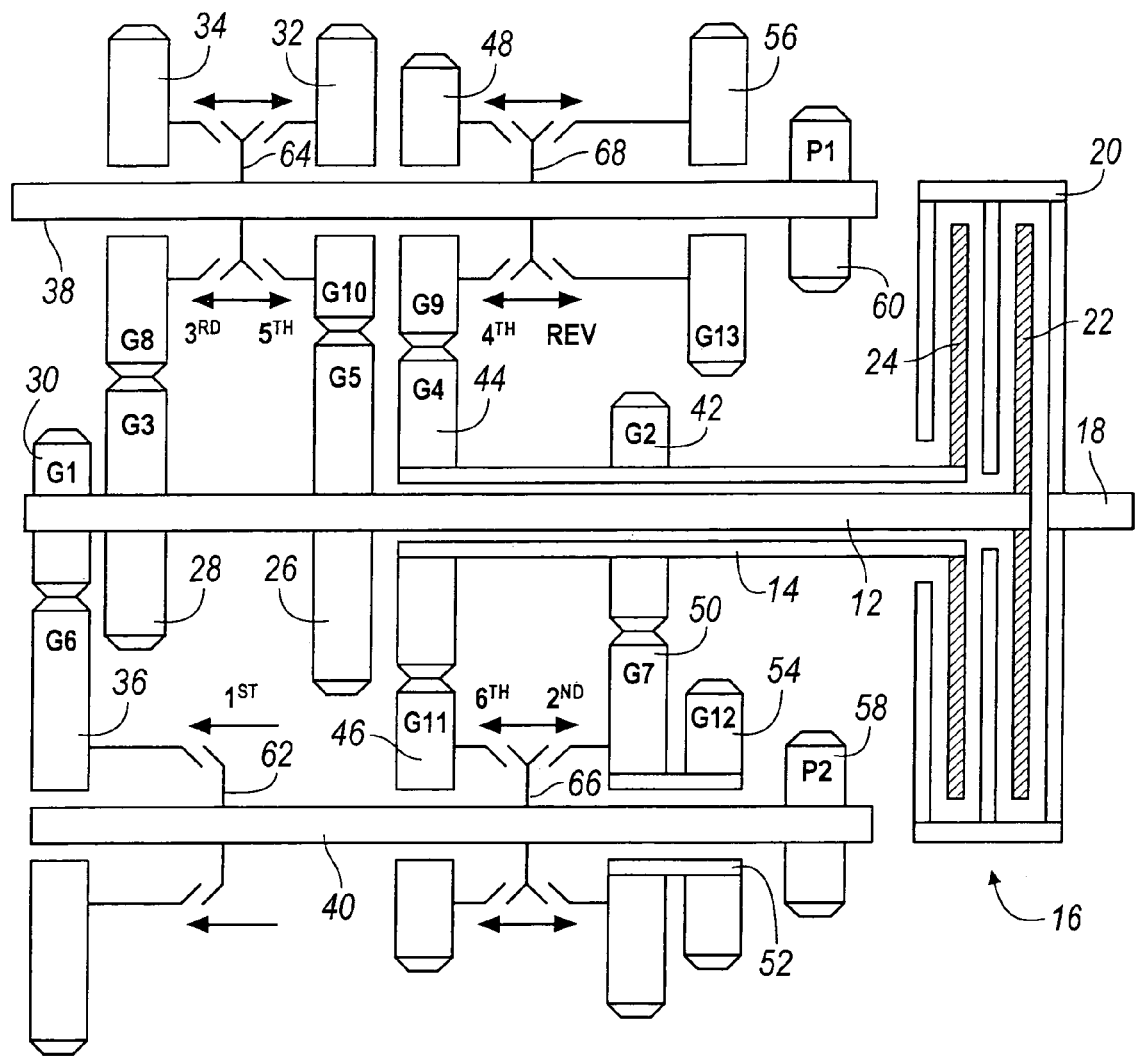
FIG. 1 is a schematic diagram of a twin clutch automatic transmission to which the actuator system can be applied.

Referring now to FIG. 1, a transmission 10 includes a first input shaft 12, and a second input shaft 14. Input shaft 14 is a sleeve shaft surrounding input shaft 12. A dual clutch mechanism 16 produces a drive connection between the crankshaft 18 of an engine, an electric motor shaft, or the shaft of another power source to the first and second input shafts 12, 14. The clutch mechanism 16 includes a rotor 20, which is driveably connected to shaft 18 and is alternately driveably connected to and disconnected from input shaft 12 when clutch 22 is engaged and disengaged, respectively. Rotor 20 is alternately driveably connected to and disconnected from input shaft 14 when clutch 24 is engaged and disengaged, respectively.

Input shaft 12 supports pinions 26, 28, 30, which are secured to shaft 12. Each pinion 26, 28, 30 is in meshing engagement with a corresponding gear 32, 34, 36, gears 32, 34 being journalled on a layshaft 38, gear 36 being journalled on a layshaft 40. Similarly, the second input shaft 14 supports pinions 42, 44. Pinion 44 is in meshing engagement with a gear 46, journalled on a layshaft 40, and a gear 48, journalled on layshaft 38. Pinion 42 is in meshing engagement with a gear 50. Gear 50 is secured to a stub shaft 52, which is journalled on layshaft 40. Gear 54, also secured to stub shaft 52, is in meshing engagement with a gear 56, which is journalled on layshaft 38.

A final drive pinion 60, secured to layshaft 38, and a final drive pinion 58, secured to layshaft 40, are in continual meshing engagement with a final drive ring gear 61 (seen best in FIG. 3), which transmits power to the axles of the driven wheels of the vehicle.

A coupler 62, which may be a synchronizer, alternately driveably engages or connects the first speed gear 36 with layshaft 40 when the sleeve of coupler 62 is displaced leftward from the neutral position shown in FIG. 1 to an engaged state, and disconnects gear 36 from layshaft 40 when that sleeve is in a neutral state, wherein no gear is engaged by coupler 62.

A coupler 64 alternately connects and disconnects the third speed gear 34 and the fifth speed gear 32 with layshaft 38 depending on the axial position or state of the selector sleeve of coupler 64. FIG. 1 shows coupler 64 in the neutral state. When the sleeve of coupler 64 is moved leftward to a drive state, coupler 64 causes gear 34 to become driveably engaged with layshaft 38. When the sleeve of coupler 64 is moved rightward to a drive state, coupler 64 causes gear 32 to become driveably engaged with layshaft 38.

Similarly, coupler 66 alternately connects and disconnects the sixth speed gear 46 and the second speed gear 50 with layshaft 40 depending on the axial position of the selector sleeve of coupler 66. FIG. 1 shows coupler 66 in the neutral state. When the sleeve of coupler 66 is moved leftward to a drive state, coupler 66 causes gear 46 to become driveably engaged with layshaft 40. When the sleeve of coupler 66 is moved rightward to a drive state, coupler 66 causes gear 50, stub shaft 52 and reverse gear 54 to become driveably engaged with layshaft 40.

A coupler 68 alternately connects and disconnects the fourth speed gear 48 and the reverse output gear 56 with layshaft 38 depending on the axial position or state of the selector sleeve of coupler 68. FIG. 1 shows coupler 68 in the neutral state. When the sleeve of coupler 68 is moved leftward to a drive state, coupler 68 causes gear 48 to become driveably engaged with layshaft 38. When the sleeve of coupler 68 is moved rightward to a drive state, coupler 68 causes gear 56 to become driveably engaged with layshaft 38.

The transmission is controlled such that it produces a current or active gear upon engaging one of the input clutches 22, 24 after the selector sleeve of the corresponding coupler has been moved to a state that produces a drive connection between a current gear and the layshaft on which the coupler is supported. In addition, the transmission is controlled to produce a preselected gear, which is produced by changing the position of the selector sleeve of the corresponding coupler to produce a drive connection between the layshaft on which the respective coupler is supported. The preselected gear becomes the current gear upon engaging the clutch 22, 24 associated with the preselected gear and disengaging the clutch 22, 24 associated with the previous current gear.

Figure 2:
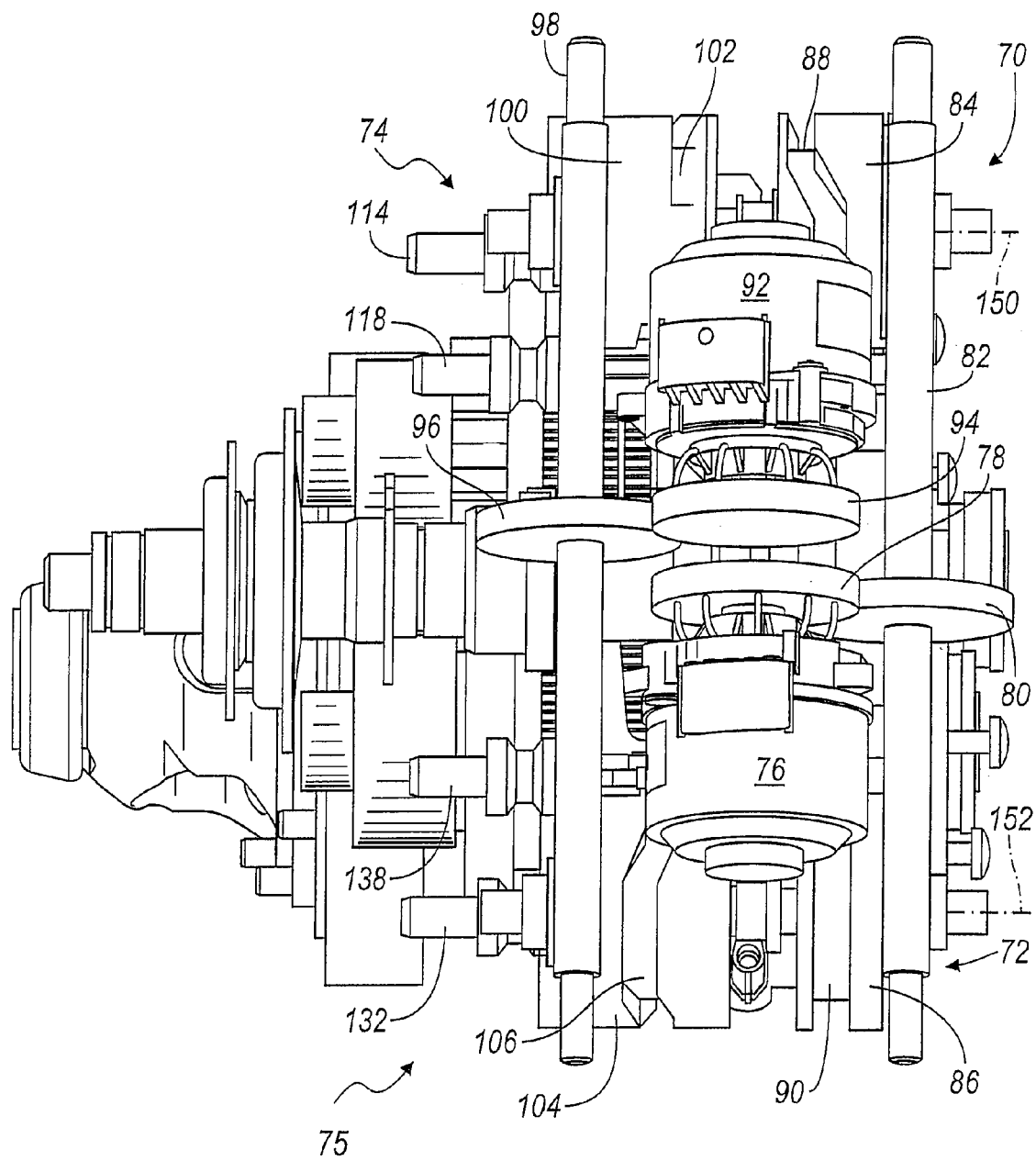
FIG. 2 is an isometric top view of the actuator system.

The couplers 62, 64, 66, 68 are preferably synchronizers, but they may be dog clutches, or a combination or synchronizers and dog clutches. Referring now to FIG. 2, the selector sleeve of coupler 62 is actuated for displacement leftward and rightward by an electro-mechanical actuator 70; the selector sleeve of coupler 64 is actuated for displacement leftward and rightward by an electro-magnetic actuator 72; the selector sleeve of coupler 66 is actuated for displacement leftward and rightward an electro-magnetic actuator 74; and the selector sleeve of coupler 68 is actuated for displacement leftward and rightward by an electro-magnetic actuator 75.

Electro-mechanical actuator 70 includes an electric motor 76; a pinion 78 secured to the motor shaft; a gear 80 meshing with pinion 78; a worm gear 82, to which gear 80 is secured; and an actuating drum 84, driveably engaged with worm gear 82. Drum 84 is formed with a cam channel 88 that extends around the periphery of the drum and in which a follower is located and guided for displacement leftward and rightward as drum 84 rotates.

Electro-mechanical actuator 72 includes the electric motor 76; pinion 78; gear 80; worm gear 82; and an actuating drum 86, driveably engaged with worm gear 82. Drum 86 is formed with a cam channel 90 that extends around the periphery of the drum, in which a follower is located and guided for displacement leftward and rightward as drum 86 rotates.

Electro-mechanical actuator 72 includes the electric motor 76; pinion 78; gear 80; worm gear 82; and an actuating drum 86, driveably engaged with worm gear 82. Drum 86 is formed with a cam channel 90 that extends around the periphery of the drum and, in which a follower is located and guided for displacement leftward and rightward as drum 88 rotates.

Electro-mechanical actuator 74 includes an electric motor 92; a pinion 94 secured to the motor shaft; a gear 96 meshing with pinion 94; a worm gear 98, to which gear 96 is secured; and an actuating drum 100, driveably engaged with worm gear 98. Drum 100 is formed with a cam channel 102 that extends around the periphery of the drum and in which a follower is located and guided for displacement leftward and rightward as drum 100 rotates.

Electro-mechanical actuator 75 includes the electric motor 92, pinion 94, gear 96, worm gear 98, and an actuating drum 104, driveably engaged with worm gear 98. Drum 104 is formed with a cam channel 106 that extends around the periphery of the drum and in which a follower is located and guided for displacement leftward and rightward as drum 104 rotates.

Figure 3:
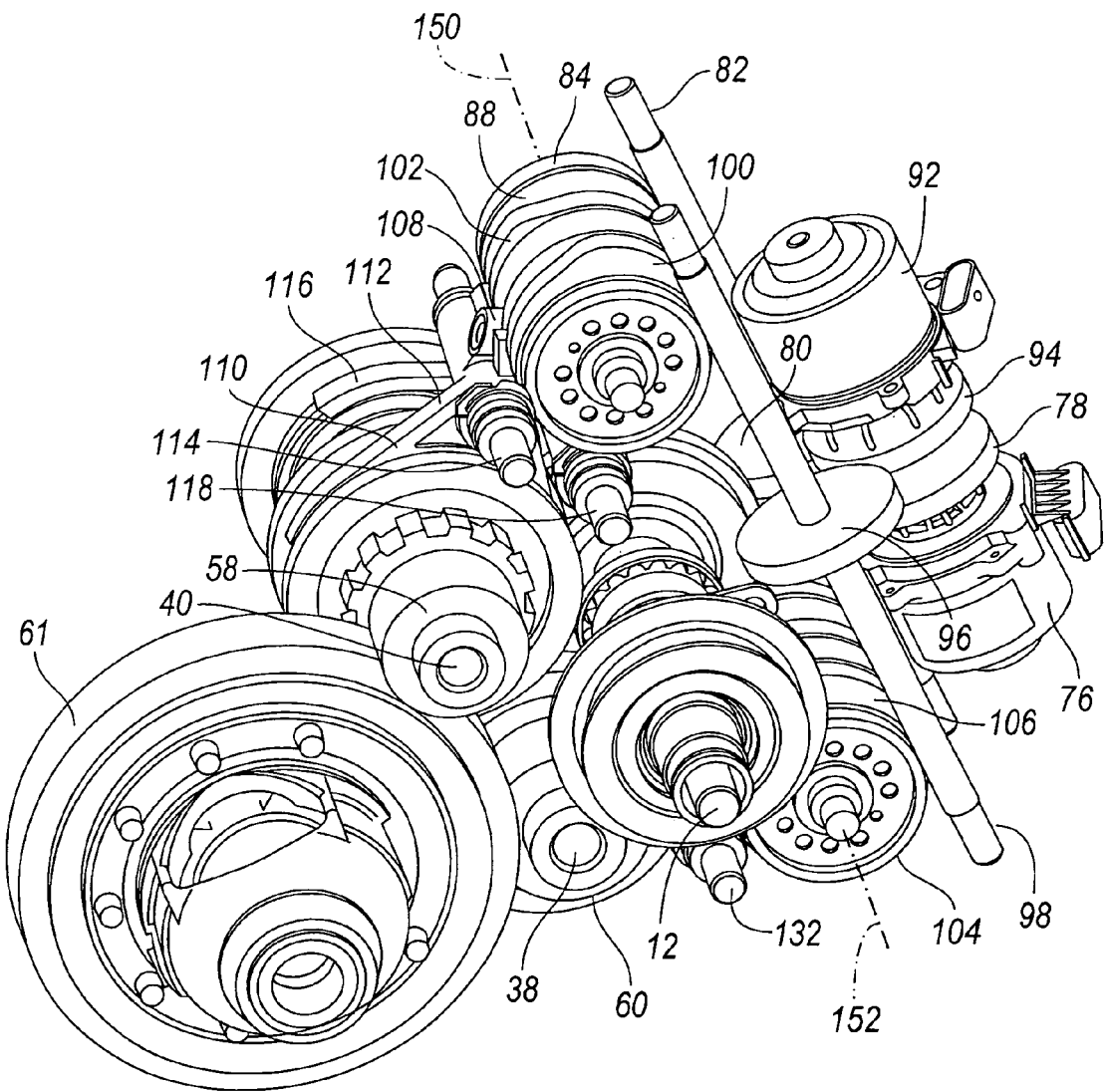
FIG. 3 is an isometric end view of the actuator system.

FIG. 3 illustrates a follower 108 located in cam channel 102 of actuator drum 100, contacting the lateral surfaces of the channel, and guided by the channel for displacement leftward and rightward as drum 100 rotates. A shift fork 110 is secured to follower 108 and the shift sleeve of coupler 66. Follower 108 includes a lug 112 formed with an axial hole, through which a guide shaft 114 passes. As drum 100 rotates, follower 108 moves axially between its neutral state and sixth gear and second gear drive states, shaft 114 supports fork 110 and guides its movement axially, and the selector sleeve of coupler 66 is engaged by shift fork 110 and is moved axially between the neutral state and the drive states by movement of the shift fork.

Another follower located in cam channel 88 of actuator drum 84 contacts the lateral surfaces of channel 88, and is guided by the channel for displacement leftward and rightward as drum 84 rotates. A shift fork 116 is secured to that follower and the shift sleeve of coupler 62. A guide shaft 118, located in a lug formed in shift fork 116, supports shift fork 116 and guides it axial movement. As drum 84 rotates, the follower moves axially between the neutral state and the first gear drive state, shaft 118 supports shift fork 116 and guides its movement axially, and the selector sleeve of coupler 62 engages shift fork 116 and is moved axially between the neutral state and the drive states by movement of the shift fork.

In a similar way, coupler 64 is displaced between a neutral state and the third gear and fifth gear drive states, which are located on axially opposite sides of the neutral state, through operation of electro-mechanical actuator 72. Coupler 68 is displaced between a neutral state and the fourth gear and reverse gear drive states, which are located on axially opposite sides of the neutral state, through operation of electro-mechanical actuator 76.

A control algorithm, stored in electronic memory accessible to the controller is repetitively executed and produces control signals that actuate clutches 22, 24 and couplers 62, 64, 66, 68. Motors 76, 92, each rotate clockwise and counterclockwise in response to the polarity and magnitude of electric current signals applied to the motor windings under control of a system controller.

Figure 4:
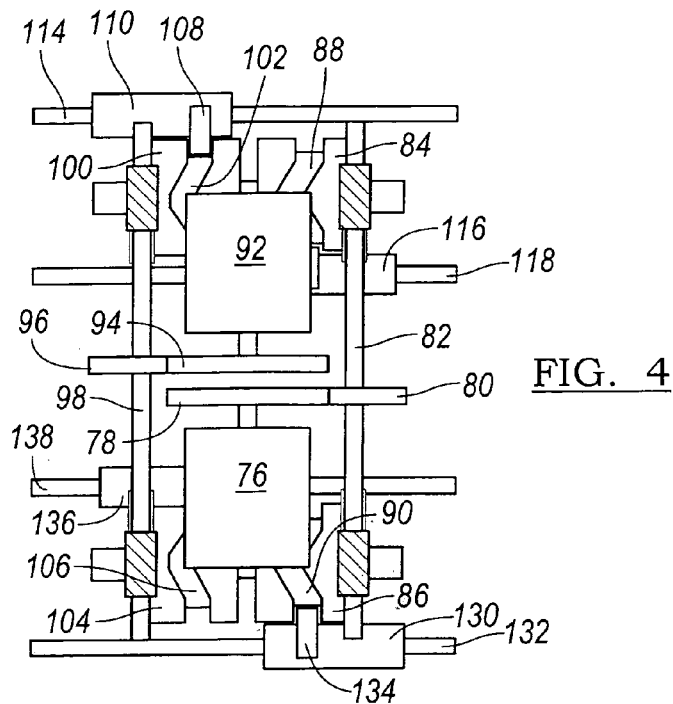
FIG. 4 a schematic diagram of a top view of the actuator system.
Figure 5:
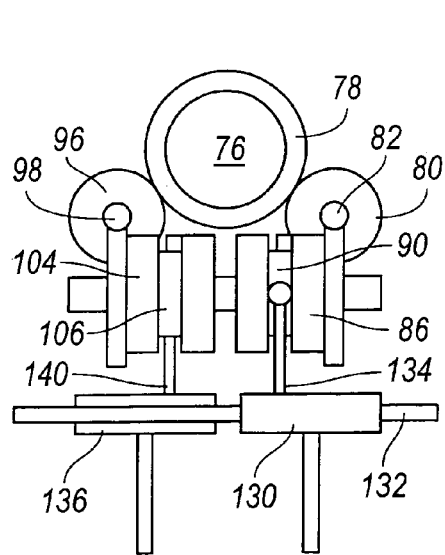
FIG. 5 a schematic diagram of an end view of the actuator system.
Figure 6:
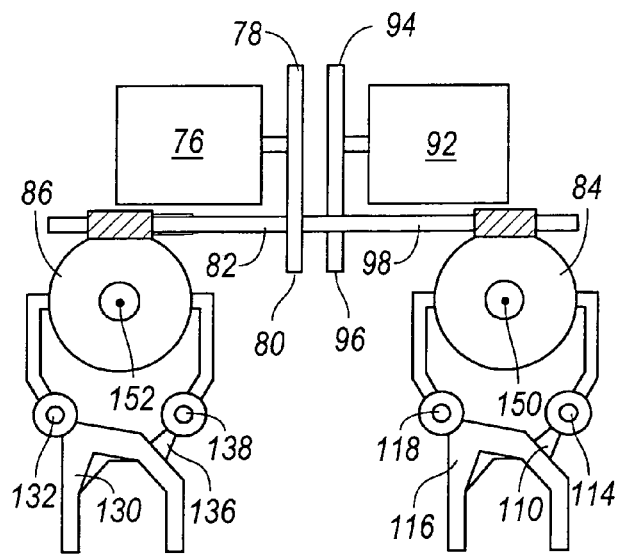
FIG. 6 a schematic diagram of a side view of the actuator system.

Referring to FIGS. 4, 5 and 6, the shift fork 130 for actuating the selector sleeve of the 3-5 coupler 64 is supported on shaft 132 for movement along the axis of that shaft. The follower 134 of shift fork 130, located in cam channel 90, follows the cam channel causing shift fork 130 to move on shaft 132 as actuator drum 86 and its cam channel 90 rotate when driven by worm gear 82.

The shift fork 136 for actuating the selector sleeve of the 4-R coupler 68 is supported on shaft 138 for movement along the axis of shaft 138. The follower 140 of shift fork 136, located in cam channel 106, follows the cam channel causing shift fork 136 to move on shaft 138 as actuator drum 104 and its cam channel 106 rotate when driven by worm gear 98. Actuator drums 84 and 100 are supported for rotation about axis 150, and actuator drums 86 and 104 are supported for rotation about axis 152.

In accordance with the provisions of the patent statutes, the preferred embodiment has been described. However, it should be noted that the alternate embodiments can be practiced otherwise than as specifically illustrated and described.

What is claimed is:

1. A system for actuating couplers to produce gear changes in a transmission for a motor vehicle comprising:
   a first electric motor having an axis of rotation;
   a second electric motor aligned axially with said axis;
   first actuator drums supported for rotation transverse to said axis and driveably connected to the first electric motor;
   first shift forks, each first shift fork driveably connected to one of the first actuator drums and supported for displacement transverse to said axis in response to rotation of a first actuator drum between a neutral state, wherein no gear is engaged, and at least one first drive state, wherein a gear of a first gear group is engaged;
   second actuator drums supported for rotation transverse to said axis and driveably connected to the second electric motor;
   second shift forks, each second shift fork driveably connected to one of the second actuator drums and supported for displacement transverse to said axis in response to rotation of a second actuator drum between a neutral state, wherein no gear is engaged, and at least one second drive state, wherein a gear of a second gear group is engaged.

2. The system of claim 1, wherein:
   the first gear group includes odd numbered gears; and
   the second group includes even numbered gears.

3. The system of claim 1, wherein:
   the first group includes only odd numbered gears; and
   the second group includes even numbered gears and a reverse gear.

4. The system of claim 1, wherein:
   each first shift fork is displaced in response to rotation of one of the first actuator drums between a neutral state, wherein no gear is engaged, and multiple first drive states, wherein a gear of the first gear group is engaged in each first drive state.

5. The system of claim 1, wherein:
   each second shift fork is displaced in response to rotation of one of the second actuator drums between a neutral state, wherein no gear is engaged, and multiple second drive states, wherein a gear of the second gear group is engaged in each second drive state.

6. The system of claim 1, wherein the first electric motor includes a first motor shaft and the second electric motor includes a second motor shaft;
   a first worm gear driveably connected to the first motor shaft and the first actuator drums; and
   a second worm gear driveable connected to the first motor shaft and the second actuator drums.

7. The system of claim 1, further comprising:
   first couplers, each first coupler alternately engaging and disengaging gears of the first gear group;
   second couplers, each second coupler alternately engaging and disengaging gears of the second gear group; and wherein
   each first shift fork is secured to one of the first couplers, for displacing said first coupler in response to rotation of one of the first actuator drums; and
   each second shift fork is secured to one of the second couplers, for displacing said second coupler in response to rotation of one of the second actuator drums.

8. The system of claim 1, wherein:
   each first actuator drum further includes a cam channel;
   each first shift fork further includes a follower fitted within the cam channel of one of the first actuator drums, each first shift fork being displaced by engagement of the respective follower with the cam channel as the first actuator drum rotates;
   each second actuator drum further includes a cam channel; and
   each second shift fork further includes a follower fitted within the cam channel of one of the second actuator drums, each second shift fork being displaced by engagement of the respective follower with the cam channel as the second actuator drum rotates.

9. The system of claim 1, further comprising:
   first support shafts, each first support shaft supporting a first shift fork thereon; and
   second support shafts, each second support shaft supporting a second shift fork thereon; and wherein:
   each first actuator drum further includes a cam channel;
   each first shift fork further includes a follower fitted within a cam channel of one of the first actuator drums, each first shift fork being displaced along a first support shaft by engagement of the respective follower with a cam channel as a first actuator drum rotates;
   each second actuator drum further includes a cam channel; and
   each second shift fork further includes a follower fitted within a cam channel of one of the second actuator drums, each first shift fork being displaced along a second support shaft by engagement of the respective follower with a cam channel as a second actuator drum rotates.

10. A system for actuating couplers to produce gear changes in a multiple gear transmission for a motor vehicle comprising:
    a first electric motor;
    a second electric motor;
    first and second actuator drums supported for rotation and driveably connected to the first motor;
    third and fourth actuator drums supported for rotation and driveably connected to the second motor;
    a first shift fork driveably connected to the first actuator drum and supported for displacement in response to rotation of the first actuator drum between a neutral state, wherein no gear is engaged, and multiple drive states, wherein a second gear and a sixth gear are engaged, respectively;
    a second shift fork driveably connected to the second actuator drum and supported for displacement in response to rotation of the second actuator drum between a neutral state, wherein no gear is engaged, and multiple drive states, wherein a fourth gear and a reverse gear are engaged, respectively;

a third shift fork driveably connected to the third actuator drum and supported for displacement in response to rotation of the third actuator drum between a neutral state, wherein no gear is engaged, and at least one drive state, wherein a first gear is engaged;

a fourth shift fork driveably connected to the fourth actuator drum and supported for displacement in response to rotation of the fourth actuator drum between a neutral state, wherein no gear is engaged, and multiple drive states, wherein a third gear and a fifth gear are engaged, respectively.

11. The system of claim 10, further comprising:

a first worm gear driveably connected to the first motor and the first and second actuator drums;

a second worm gear driveably connected to the second motor and the third and fourth actuator drums.

12. The system of claim 10, further comprising:

a first pinion-gear pair including a first pinion driveably connected to the first motor, and a first gear meshing with the first pinion;

a first worm gear driveably connected to the first gear and the first and second actuator drums;

a second pinion-gear pair including a second pinion driveably connected to the second motor, and a second gear meshing with the second pinion; and a second worm gear driveably connected to the second gear and the third and fourth actuator drums.

13. The system of claim 10, further comprising:

a first coupler supported on a shaft and alternately engaging and disengaging said shaft with the second gear and the sixth gear;

a second coupler supported on a shaft and alternately engaging and disengaging said shaft with the fourth gear and the reverse gear;

a third coupler supported on a shaft and alternately engaging and disengaging the first gear and said shaft;

a fourth coupler supported on a shaft and alternately engaging and disengaging said shaft with the third gear and the fifth gear; and wherein the first shift fork is secured to the first coupler, for displacing the first coupler in response to rotation of a first actuator drum;

the second shift fork is secured to the second coupler, for displacing the second coupler in response to rotation of the second actuator drum;

the third shift fork is secured to the third coupler, for displacing the third coupler in response to rotation of the third actuator drum; and the fourth shift fork is secured to the fourth coupler, for displacing the fourth coupler in response to rotation of the fourth actuator drum.

14. The system of claim 10, wherein:

the first actuator drum further includes a first cam channel;

the first shift fork further includes a first follower fitted within the first cam channel, the first shift fork being displaced by engagement of the first follower wit said first cam channel as the first actuator drum rotates;

the second actuator drum further includes a second cam channel;

the second shift fork further includes a second follower fitted within the second cam channel, the second shift fork being displaced by engagement of the second follower with the second cam channel as the second actuator drum rotates;

the third actuator drum further includes a third cam channel;

the third shift fork further includes a third follower fitted within the third cam channel, the third shift fork being displaced by engagement of the third follower with the third cam channel as the third actuator drum rotates;

the fourth actuator drum further includes a fourth cam channel; and the fourth shift fork further includes a fourth follower fitted within the fourth cam channel, the fourth shift fork being displaced by engagement of the fourth follower with the fourth cam channel as the fourth actuator drum rotates.

15. The system of claim 10, further comprising:

a first support shaft supporting the first shift fork thereon;

a second support shaft supporting the second shift fork thereon;

a third support shaft supporting the third shift fork thereon;

a fourth support shaft supporting the fourth shift fork thereon; and wherein:

the first actuator drum further includes a cam channel;

the first shift fork further includes a first follower fitted within the first cam channel, the first shift fork being displaced along the first support shaft by engagement of the first follower with said first cam channel as the first actuator drum rotates;

the second actuator drum further includes a second cam channel;

the second shift fork further includes a second follower fitted within the second cam channel, the second shift fork being displaced along the second support shaft by engagement of the second follower with the second cam channel as the second actuator drum rotates;

the third actuator drum further includes a third cam channel;

the third shift fork further includes a third follower fitted within the third cam channel, the third shift fork being displaced along the third support shaft by engagement of the third follower with the third cam channel as the third actuator drum rotates;

the fourth actuator drum further includes a fourth cam channel; and the fourth shift fork further includes a fourth follower fitted within the fourth cam channel, the fourth shift fork being displaced along the fourth support shaft by engagement of the fourth follower with the fourth cam channel as the fourth actuator drum rotates.

16. A system for actuating couplers to produce gear changes in a transmission for a motor vehicle comprising:

a first electric motor having an axis of rotation;

a first pinion drivable connected to the first motor about the axis;

a first gear engaged with the first pinion and supported for rotation eccentric of said axis;

a second electric motor aligned with said axis;

first actuator drums supported for rotation transverse to said axis and driveably connected to the first motor through the first pinion and the first gear;

first shift forks, each first shift fork driveably connected to one of the first actuator drums and supported for displacement transverse to said axis in response to rotation of one of the first actuator drums between a neutral state, wherein no gear is engaged, and at least one first drive state, wherein a gear of a first gear group is engaged;

a second pinion drivable connected to the second motor about the axis;

a second gear engaged with the second pinion and supported for rotation eccentric of said axis;

second actuator drums supported for rotation transverse to said axis and driveably connected to the second motor through the second pinion and the second gear; and second shift forks, each second shift fork driveably connected to one of the second actuator drums and supported for displacement transverse to said axis in response to rotation of one of the second actuator drums between a neutral state, wherein no gear is engaged, and at least one second drive state, wherein a gear of a second gear group is engaged.

17. The system of claim 16, further comprising:

a first worm gear driveably connected to the first motor and the first actuator drums through the first pinion and the first gear; and a second worm gear driveably connected to the second actuator drums through the first pinion and the first gear.

18. The system of claim 16, further comprising:

first couplers, each first coupler alternately engaging and disengaging gears of the first gear group;

second couplers, each second coupler alternately engaging and disengaging gears of the second gear group; and wherein each first shift fork is secured to one of the first couplers for displacing said first coupler in response to rotation of one of the first actuator drums; and each second shift fork is secured to one of the second couplers, for displacing said second coupler in response to rotation of one of the second actuator drums.

19. The system of claim 16, wherein:

each first actuator drum further includes a cam channel;

each first shift fork further includes a follower fitted within a cam channel of one of the first actuator drums, each first shift fork being displaced by engagement of the respective follower with a cam channel as the first actuator drum rotates;

each second actuator drum further includes a cam channel; and each second shift fork further includes a follower fitted within a cam channel of one of the second actuator drums, each second shift fork being displaced by engagement of the respective follower with a cam channel as the second actuator drum rotates.

20. The system of claim 16, further comprising:

first support shafts, each first support shaft supporting a first shift fork thereon; and second support shafts, each second support shaft supporting a second shift fork thereon; and wherein:

each first actuator drum further includes a cam channel;

each first shift fork further includes a follower fitted within a cam channel of one of the first actuator drums, each first shift fork being displaced along one of the first support shafts by engagement of the respective follower with a cam channel as one of the first actuator drums rotates;

each second actuator drum further includes a cam channel; and each second shift fork further includes a follower fitted within a cam channel of one of the second actuator drums, each second shift fork being displaced along a second support shaft by engagement of the respective follower with a cam channel as one of the second actuator drums rotates.

* * * * *